(12) United States Patent
Fukaya et al.

(10) Patent No.: US 8,112,064 B2
(45) Date of Patent: Feb. 7, 2012

(54) FUNCTION LOCK INFORMATION NOTIFICATION METHOD AND MOBILE COMMUNICATION TERMINAL

(75) Inventors: Masato Fukaya, Tokyo (JP); Ryota Tamura, Tokyo (JP); Aiko Matsuda, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 1120 days.

(21) Appl. No.: 11/898,068

(22) Filed: Sep. 7, 2007

(65) Prior Publication Data

US 2008/0064370 A1 Mar. 13, 2008

Related U.S. Application Data

(63) Continuation of application No. PCT/JP2006/304260, filed on Mar. 6, 2006.

(30) Foreign Application Priority Data

Mar. 8, 2005 (JP) .................................. 2005-064020

(51) Int. Cl.
*H04M 1/66* (2006.01)
*H04M 3/16* (2006.01)

(52) U.S. Cl. .................... 455/411; 455/410; 455/419

(58) Field of Classification Search ............. 455/411, 455/410, 419, 418, 565, 557, 461, 420; 709/229, 709/217
See application file for complete search history.

(56) References Cited

U.S. PATENT DOCUMENTS

| | | | | |
|---|---|---|---|---|
| 7,233,785 B2 * | 6/2007 | Yamagishi et al. | ........... | 455/411 |
| 2001/0004591 A1 * | 6/2001 | Jeong | ............................. | 455/419 |
| 2003/0148799 A1 | 8/2003 | Chen | | |
| 2004/0063423 A1 * | 4/2004 | Kagay, Jr. | ..................... | 455/410 |
| 2004/0203601 A1 * | 10/2004 | Morriss et al. | ................ | 455/411 |
| 2004/0224665 A1 | 11/2004 | Kokubo | | |
| 2006/0211408 A1 * | 9/2006 | Yamagishi et al. | ........... | 455/411 |

FOREIGN PATENT DOCUMENTS

| | | |
|---|---|---|
| EP | 1363425 | 11/2003 |
| JP | 62-70766 | 4/1987 |
| JP | 05-072223 | 3/1993 |

(Continued)

OTHER PUBLICATIONS

Taiwan IPO Search Report dated Dec. 27, 2010 with English Translation.

*Primary Examiner* — Kiet Doan

(74) *Attorney, Agent, or Firm* — Kratz, Quintos & Hanson, LLP

(57) ABSTRACT

If a lock request for function of an IC card function section is executed from a locking terminal via a mobile communication network, a lock request detection section 51 detects the lock request. If the lock request is detected in this manner, the function lock section 52 locks the function of the IC card function section by sending a function lock instruction via a wired communication path to the IC card function section. The function lock notification section 53 then notifies the fact that the function has been locked to a locking notification mail communication unit pre-registered in the terminal registration table 23T via the mobile communication network. In this way, since function lock information of a contactless type communication device fitted in a mobile communication terminal is appropriately notified via a mobile communication network, convenience for the user is improved.

17 Claims, 12 Drawing Sheets

FOREIGN PATENT DOCUMENTS

| | | |
|---|---|---|
| JP | 10-224509 | 8/1998 |
| JP | 2001-223631 | 8/2001 |
| JP | 2001-326719 | 11/2001 |
| JP | 2003-85466 | 3/2003 |
| JP | 2004-207993 | 7/2004 |
| JP | 2004-274310 | 9/2004 |
| JP | 2004-297156 | 10/2004 |
| JP | 2005-12474 | 1/2005 |
| TW | 565085 | 12/2003 |
| TW | 565087 | 12/2003 |
| WO | 2005/002185 | 1/2005 |

* cited by examiner

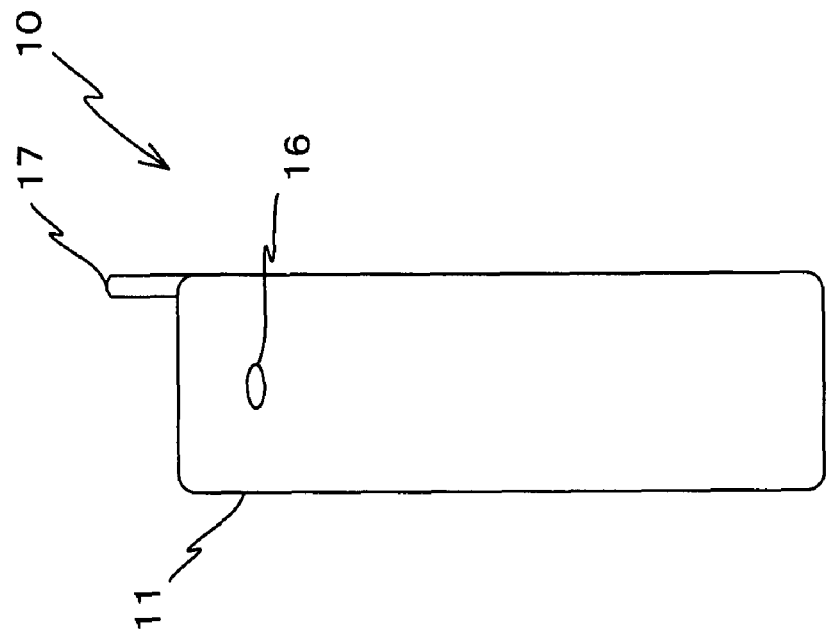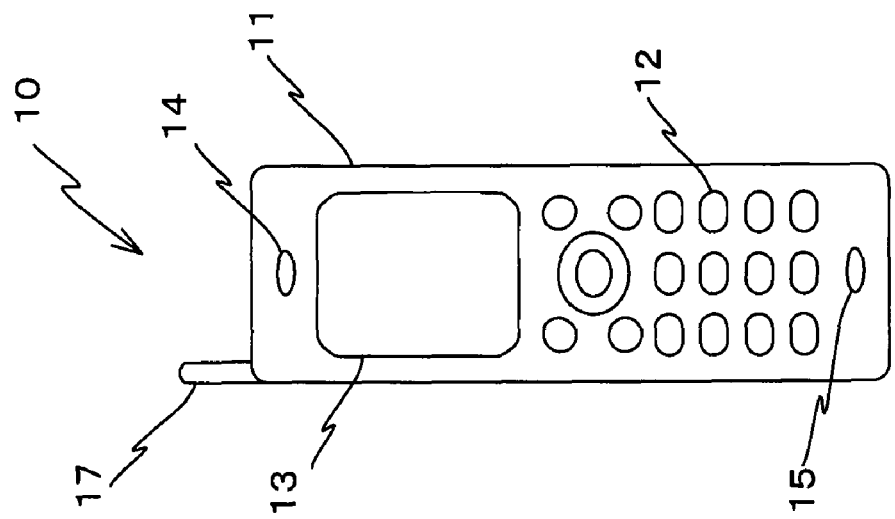

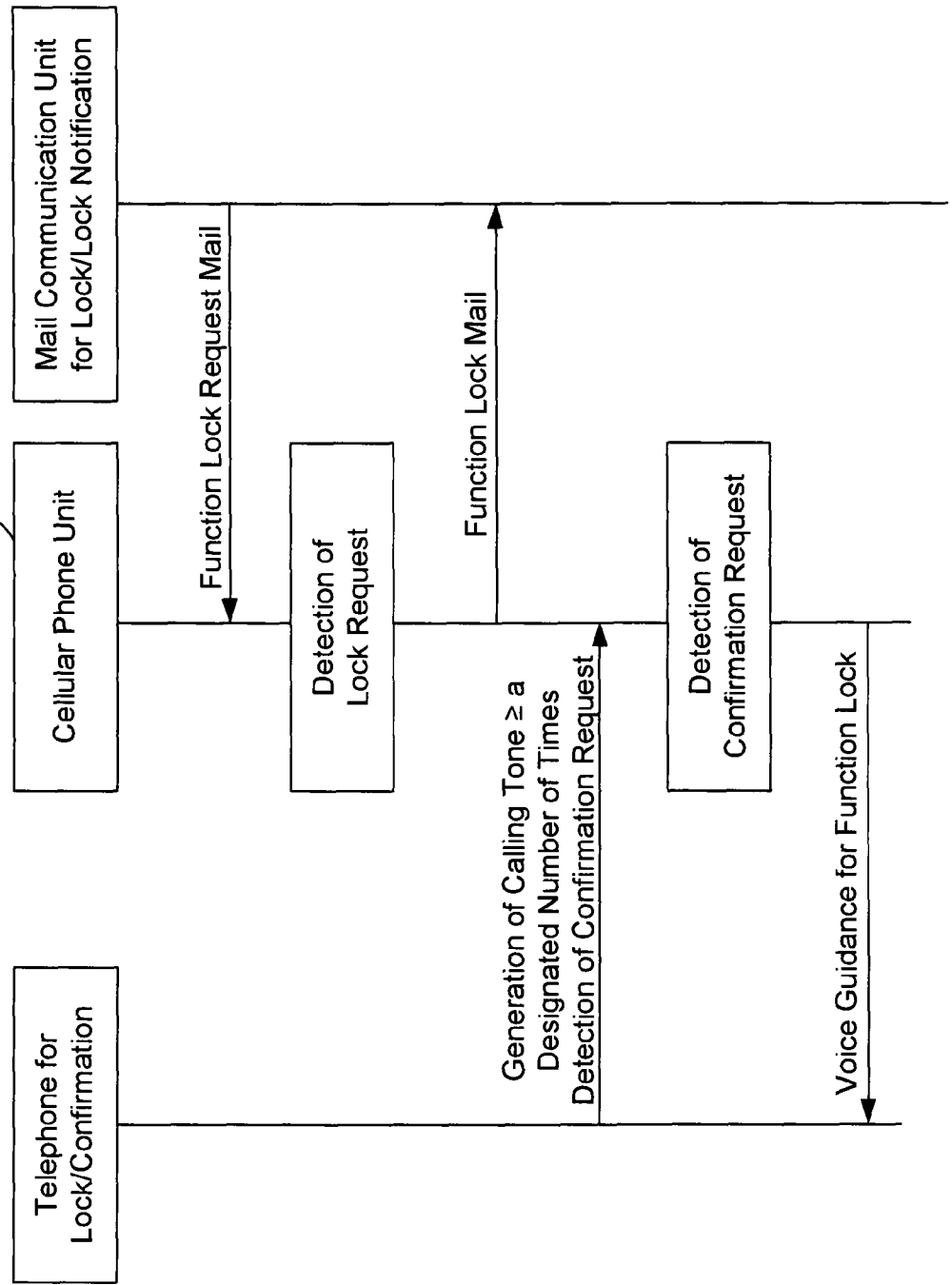

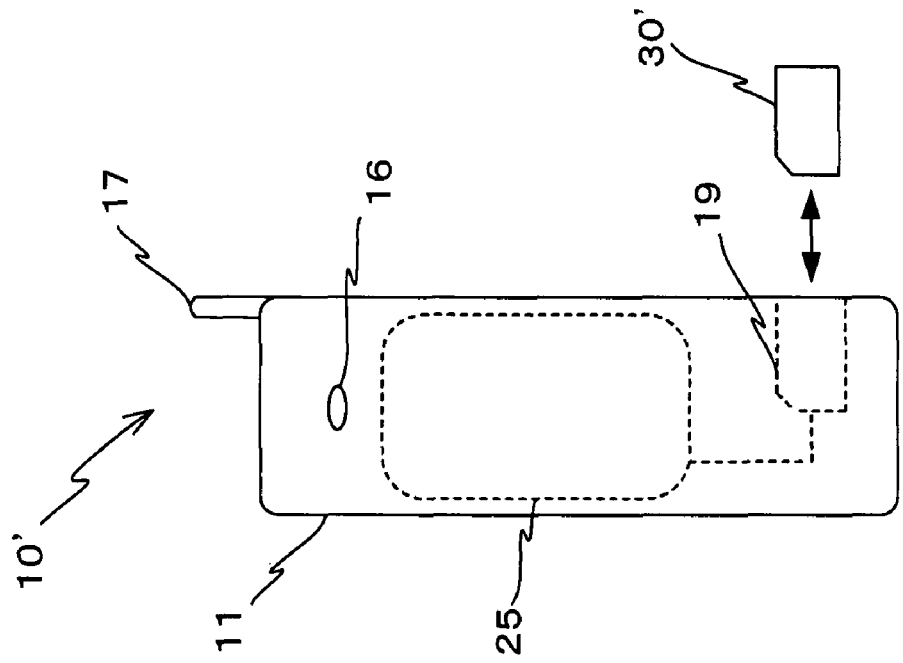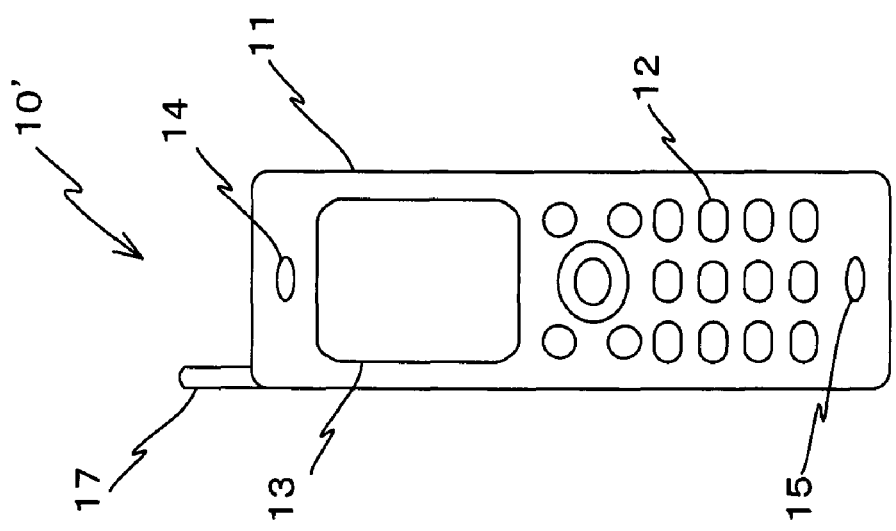

FUNCTION LOCK INFORMATION NOTIFICATION METHOD AND MOBILE COMMUNICATION TERMINAL

RELATED APPLICATION

This is a continuation application of the international patent application No. PCT/JP2006/304260 filed with Application date: Mar. 6, 2006. The present application is based on, and claims priority from, J.P. Application 2005-064020, filed on Mar. 8, 2005, the disclosure of which is hereby incorporated by reference herein its entirety.

BACKGROUND OF THE INVENTION

The present invention relates to a function lock information notification method and a mobile communication terminal, and in more detail relates to a function lock information notification method, in the mobile communication terminal fitted with a contactless type communication device, which is capable of communicating with the mobile communication terminal for notifying lock information for a function of the contactless type communication device via a wired communication path, and to a mobile communication terminal for notifying the function lock information notification method.

BACKGROUND ART

Portable information terminals such as portable telephones have become widespread in recent years. With mobile telephones, for example, that have seen remarkable improvements in the functions and performance of these type of portable information terminals, devices are being introduced that are provided with contactless type communication devices that perform contactless type communication in addition to necessary functions such as a call function and an e-mail transceiving function, and also fulfill a so-called IC-card function which has become widely used in recent years. Here, a "contactless communication device" refers to devices that perform contactless type communication utilizing radio communication between communicating parties, such as a reader writer, and no communication contacts on the surface of a device. Such a "contactless type communication device" derives operating power using electromagnetic induction generated by radio waves from a communicating party received by an antenna (coil) mounted within the device. As such contactless type communication devices, there are those that are card shaped, such as a so-called IC card, that are capable of being inserted into a portable information terminal (see patent document 1), and those that are fixedly built into a portable information terminal (see patent document 2).

These types of contactless communication devices contain IC chips such as a CPU (central processing unit) chip or a memory chip. Such contactless communication devices have a high degree of security, and as a result are gradually being used for functions that are important to an individual, such as storing information that should not easily be made available to others, for example, prepaid rail card usage history and financial transaction type electronic money.

With portable communication devices fitted with a contactless type communication device, it is generally possible for a user to arbitrarily lock a function of the contactless type communication device by issuing a command from an operating section of the portable information device. Technology has also been proposed where, in locking the functions of the contactless type communication device, in the event that a portable information terminal fitted with the contactless communication device is lost, the functions of the contactless type communication device are locked via a mobile communication network (hereafter, referred to as "remote function lock" or "remote lock") (see patent document 3).

A method where a user performs instruction input from an operating section of the portable information device and a function confirmation screen is displayed on a display section by changing the display section screen is adopted in confirming this type of lock of a contactless type communication device function.

Patent document 1: Japanese patent laid-open No. 2001-223631

Patent document 2: Japanese patent laid-open No. 2003-85466

Patent document 3: Japanese patent laid-open No. 2004-297156

SUMMARY OF THE INVENTION

The above-described remote function lock technology is excellent for handling situations such as loss of the mobile communication terminal. However, with the proposed remote function lock method, it was not possible for the user to be reliably notified of the fact that a function had been locked as a result of sending a remote function lock instruction to the mobile communication terminal.

For this reason, once the remote function lock instruction has been performed there is no way for the user to confirm that the remote function lock instruction has been correctly executed. As a result, it can not be certain that the remote function lock command has been implemented.

In order to resolve the aforementioned situation, it is the object of the present invention to provide a function lock information notification method capable of improving convenience to a user by appropriately notifying information about a function lock of a contactless type communication device contained in a mobile communication terminal via a mobile communication network.

Another object of the present invention is to provide a mobile communication terminal capable of appropriately notifying function lock information of a fitted contactless type device via a mobile communication network.

The present invention is directed to a function lock information notification method for notifying lock information for a function of a contactless type communication device of a mobile communication terminal fitted with the contactless communication device that is capable of communication via a wired communication path, comprising the steps of, performing, to the mobile communication terminal, a lock request for a function of the contactless type communication device from a locking terminal via a mobile communication network; causing the mobile communication terminal to lock the function of the contactless type communication device via the wired communication path; and notifying the fact that the function of the contactless communication device has been locked to a function lock information notified party pre-registered in the communication terminal via the mobile communication network by the mobile communication terminal.

With this function lock information notification method, in the function lock request step, if a lock request for a function of the contactless type communication device from the locking terminal is executed in the mobile communication terminal via the mobile communication network, then in the function lock step the mobile communication terminal locks the function of the contactless communication device via the wired network. This contactless type communication device remote function lock is carried out with a specified user action as a trigger, for example, when the mobile communication terminal is lost and so forth, as soon as the user realizes he has lost his phone.

In this way, if a remote function lock for a contactless type communication device is carried out, then in the function lock notification step the fact that the function of the contactless type communication device has been locked is notified by the mobile communication terminal to a function lock notification party pre-registered in the mobile communication terminal. As a result, it is possible for the user of the mobile communication terminal to confirm that the function of the contactless communication device provided in the mobile communication terminal has been locked by referring to the communication terminal of the function lock notification party.

Therefore, according to the function lock information notification method of the present invention, since it is possible for a user to confirm that the function of a contactless type communication device built in to a mobile communication terminal has been locked; it is possible to improve the convenience for the user.

With the function lock information notification method of the present invention, it is possible for the locking terminal to be a communication terminal having an identifier for a lock request possible originator pre-registered in the mobile communication terminal. In this case, as a result of the user setting a home telephone, public telephone or home personal computer and so forth as a lock request possible originator in the mobile communication terminal in advance and registering identifiers such as phone numbers or e-mail addresses of these devices, it is possible to ensure the convenience for the user while appropriately restricting lock request possible originators. In this case, "e-mail" also includes short messages exchanged using a circuit switching method. Also, "e-mail address" refers to an identifier for a terminal carrying out transmission or reception of e-mail, and also includes a telephone number and an "e-mail address" used as an identifier for a transmitting terminal or receiving terminal relating to short messages, for example. In this specification, the terms "e-mail" and "e-mail address" will be used to convey this meaning.

With the function lock information notification method of the present invention it is also possible for the locking terminal to comprise at least one calling phone, and for the mobile communication terminal to recognize that a lock request has been received upon detection of generation of a calling tone a predetermined number of times after a call is received from the at least one calling phone. In this case, "generation of a calling tone a predetermined number of times" does not mean generation of the calling tone less than the predetermined number of times, or generation of a calling tone in excess of the predetermined number of times, but the generation of the calling tone exactly the predetermined number of times. In this specification, the term "generation of a calling tone a specified number of times" is used to convey this meaning.

In this case, it is possible to lock function of a contactless type communication device provided in a mobile communication terminal that has been lost by the simple operation of generating a calling tone a predetermined number of times using a calling telephone unit such as a home telephone or a public telephone.

Also, with the function lock information notification method of the present invention, it is possible for at least one messaging terminal to be contained in the locking terminal, and the mobile communication terminal recognizes that there is a lock request upon receipt of an e-mail of predetermined content from the at least one messaging terminal. In this case, it is possible to lock the function of a contactless type communication terminal provided in a mobile communication terminal that has been lost by the simple operation of sending an e-mail with predetermined content, such as a title and text, for example, to the mobile communication terminal as a function lock request mail using the messaging terminal such as a home personal computer.

With the function lock information notification method of the present invention, it is possible to further comprising the steps of performing, to the mobile communication terminal, a confirmation request for lock of the function from a confirmation terminal via a mobile communication network; and sending confirmation information, wherein content that the function of the contactless type communication device is locked, to the confirmation terminal in response to the confirmation request, by the mobile communication terminal, when the function of the contactless type communication device is locked.

In this case, in the lock confirmation request step, when, to the mobile communication terminal, a confirmation request for lock of the function of the contactless type communication terminal from a confirmation terminal is executed via a mobile communication network, if the function of the contactless type communication device is locked, then in the confirmation information transmission step the mobile communication terminal transmits confirmation information with content that the function of the contactless type communication terminal is locked to the confirmation terminal as a response to the confirmation request. As a result, after function lock of the contactless type communication device, the user of the mobile communication terminal can confirm that the function of the contactless communication device is locked in the confirmation terminal used for the confirmation request.

The confirmation terminal can be a communication terminal having an identifier for a confirmation request possible originator pre-registered in the mobile communication terminal. In this case, as a result of the user setting a home telephone, public telephone or home personal computer and so forth as a confirmation lock terminal in the mobile communication terminal in advance and registering identifiers such as phone numbers or e-mail addresses of these terminals, it is possible to ensure the convenience for the user while appropriately restricting the confirmation request possible terminal.

It is also possible for the confirmation terminal to comprise at least one calling phone, and for the mobile communication terminal to confirm that the confirmation request has been received upon detection of generation of a calling tone more than a predetermined number of times after a call is received from the at least one calling phone. In this case, it is possible to confirm that function of a contactless type communication device provided in a mobile communication terminal that has been lost has been locked by the simple operation of generating a calling tone more than a specified number of times using a calling telephone unit such as a house telephone or a public telephone.

In the case of adopting a calling telephone as a confirmation terminal, the confirmation information can be made a voice message. In this case, the confirmation information is notified to the confirmation terminal in a form that is easy for the user to comprehend.

Also, in the case where confirmation is carried out using a confirmation terminal, it is possible to include the confirmation terminal in the locking terminal.

A mobile communication terminal of the present invention, is fitted with a contactless type communication device capable of communication via a wired communication path, and comprises: lock request detection means for detecting a lock request for a function of the contactless type communication terminal received from the locking terminal via a mobile communication network; function lock means for locking the function of the contactless type communication device, via the wired communication path, when the lock request has been detected by the function lock request detection means; and function lock notification means for notifying the fact that the function of the contactless communication device has been locked to a pre-registered function lock notified party via the mobile communication network.

With this mobile communication terminal, if a lock request for function of the contactless type communication device from the locking terminal via the mobile communication network is executed to the mobile communication terminal, then the function lock means locks the function of the contactless communication device via the wired network. Continuing on, function lock notification means notifies the fact that the function of the contactless communication device has been locked to a function lock information notified party pre-registered within the mobile communication terminal via the mobile communication network.

Namely, it is possible to use the above-described function lock information notification method by using the mobile communication terminal of the present invention. Accordingly, with the mobile communication terminal of the present invention it is possible to appropriately notifying function lock information of a fitted contactless type device via a mobile communication network, making it possible to improve convenience for the user.

With the mobile communication terminal of the present invention, it is possible to further provide storage means for storing a terminal registration table registering an identifier for the locking terminal and identifiers for notification communication terminals that are notified parties for the fact that the function is locked. In this case, as a result of the user setting a home telephone, public telephone or home personal computer and so forth as a lock request possible originator in the mobile communication terminal in advance and registering identifiers such as phone numbers or e-mail addresses of these devices, it is possible to ensure the convenience for the user while appropriately restricting lock request possible originators.

Also, with the mobile communication terminal of the present invention it is also possible for the locking terminal to comprise at least one calling telephone, and for the mobile communication terminal to be provided with calling tone lock request detection means for recognizing that there is a lock request upon detection of generation of a calling tone a predetermined number of times after a call has been received from the at least one calling telephone. In this case, it is possible to lock function of a contactless type communication device provided in a mobile communication terminal that has been lost by the simple operation of generating a calling tone a predetermined number of times using a calling telephone unit such as a home telephone or a public telephone.

Also, with the mobile communication terminal of the present invention, it is possible for at least one messaging terminal to be contained in the locking terminal, and for the lock request detection means to be provided with mail lock request detection means for confirming that there is a lock request upon receipt of an e-mail of predetermined content from the at least one messaging terminal. In this case, it is possible to lock startup of a contactless type communication device provided in a mobile communication terminal that has been lost by the simple operation of sending an e-mail with predetermined content, such as a title and text, for example, to the mobile communication terminal as a function lock request mail using the messaging terminal such as a home personal computer.

Also, with the mobile communication terminal of the present invention, it is possible to further comprise lock confirmation request detection means for detecting receipt of a confirmation request for lock of the function from a confirmation terminal via a mobile communication network; and confirmation information transmission means for transmitting confirmation information, with content that the function of the contactless type communication device is locked, to the confirmation terminal in response to the confirmation request, when the function of the contactless type communication device is locked.

In this case, if a confirmation request for function lock of the contactless type communication device from the confirmation terminal via the mobile communication network is carried out to the mobile communication terminal, the lock confirmation request detection means detects the confirmation request. Continuing on, in the event that function of the contactless type communication device is locked, the confirmation information transmission means transmits confirmation information with content that the function of the contactless type communication device is locked to the confirmation terminal in response to the confirmation request. As a result, after function lock of the contactless type communication device, the user of the mobile communication terminal can confirm that the function of the contactless communication device is locked in the confirmation terminal used for the confirmation request.

The terminal registration table can be configured to further register an identifier for the confirmation terminal. In this case, as a result of the user setting a home telephone, public telephone or home personal computer and so forth as a confirmation terminal in the mobile communication terminal in advance and registering identifiers such as phone numbers or e-mail addresses of these devices, it is possible to ensure the convenience for the user while appropriately restricting the confirmation request possible terminal.

It is also possible for the confirmation terminal to have at least one calling phone, and for the lock confirmation request detection means to be provided with calling tone confirmation detection means for confirming that there is a confirmation request upon detection of generation of a calling tone more than a predetermined number of times after a call has been received from the at least one calling phone in a state where function of the contactless type communication device is locked. In this case, it is possible to confirm that function of a contactless type communication device provided in a mobile communication terminal that has been lost has been locked by the simple operation of generating a calling tone more than a predetermined number of times using a calling telephone unit such as a home telephone or a public telephone.

In the case of adopting a calling telephone as a confirmation terminal, the confirmation information transmission mean can be configured to send voice guidance as the confirmation information. In this case, the confirmation information is notified to the confirmation terminal in a form that is easy for the user to comprehend.

As has been described above, according to the function lock information notification method of the present invention, it is possible to improve convenience for a user by appropriately notifying function lock information for a contactless type communication device provided in a mobile communication terminal via a mobile communication network.

Also, according to the mobile communication terminal of the present invention, it is possible to appropriately notify function lock information of a fitted contactless type device via a mobile communication network.

BRIEF DESCRIPTION OF DRAWINGS

FIG. 1A is a front view schematically showing the external structure of a cellular phone of one embodiment of the present invention;

FIG. 1B is a rear view schematically showing the external structure of a cellular phone of one embodiment of the present invention;

FIG. 10 is a sequence diagram for describing another example of a remote function lock and function lock confirmation operation for the IC card function section of FIG. 2;

FIG. 11A is a front view schematically showing the external structure of a cellular phone of a modified example;

FIG. 11B is a rear view schematically showing the external structure of a cellular phone of a modified example.

DETAILED DESCRIPTION

Figure 2:
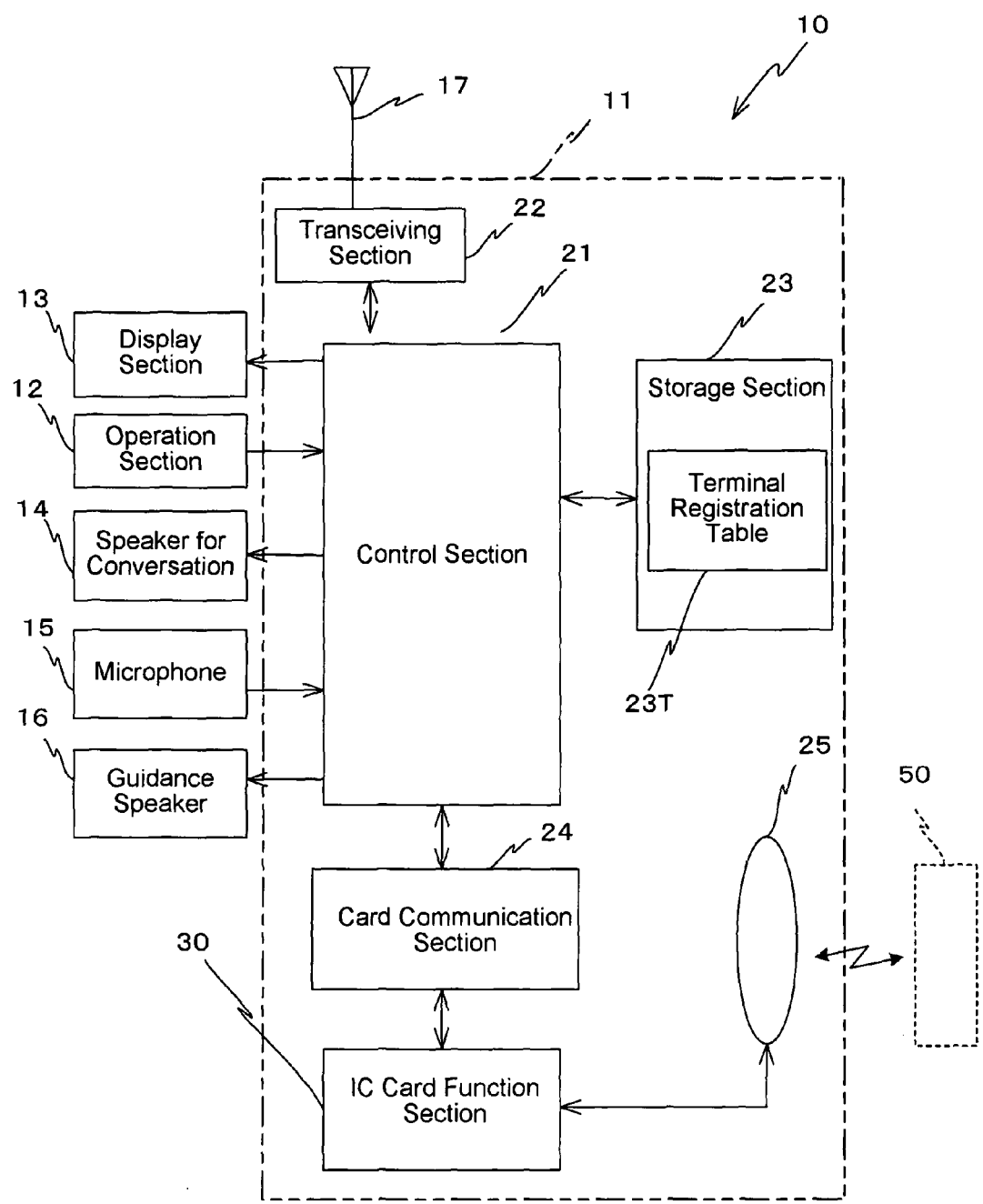
FIG. 2 is functional block diagram for describing the internal structure of the cellular phone of FIG. 1.

One embodiment of the present invention will be described in the following with reference to FIG. 1-FIG. 10. Note that in these drawings, elements that are the same or equivalent have the same reference numbers assigned, and repeat description will be omitted. Also, in the description of this embodiment the simple term "mail" means "e-mail".

The external structure of a cellular phone 10, being a mobile communication terminal, is schematically shown in FIG. 1A and FIG. 1B. In this embodiment, a front view of the external appearance of the cellular phone 10 is shown in FIG. 1A, and a rear view of the external appearance of the cellular phone 10 is shown in FIG. 1B.

As shown comprehensively in FIG. 1A and FIG. 1B, the cellular phone 10 comprises (a) a cellular phone main body 11, (b) an operation section 12 having a numerical key pad for inputting telephone numbers and function keys for inputting various commands such as functional mode switching to a control section 21, (c) a display section 13 having a liquid crystal display for displaying operational guidance, operational status, received messages and so forth, (d) a speaker for conversation 14 for reproducing voice signals transmitted from a opposite party at the time of a call, (e) a microphone 15 for inputting sound during the capture and for inputting voice at the time of a call, (f) a guidance speaker 16 for generating calling tones and guidance, and (g) an antenna 17 for transfer of wireless signals to and from a base station.

As shown in FIG. 2, the cellular phone main body 11 is internally provided with (i) a control section 21 for controlling overall operation of the cellular phone 10, (ii) a transceiver section 22 for transceiving wireless signals to and from a base station via the antenna 17, (iii) a storage section 23 having read only memory (ROM) elements and random access memory (RAM) elements for storing various data, (iv) an IC card function section 30 fulfilling an IC card function, (v) a card communication section 24 for the control section 21 to perform contact type communication with the IC card function section 30, and (vi) an antenna 25 for the IC card function section 30 to perform contactless type communication with a reader writer 50. Note that, with this embodiment the IC card function section 30 is set so that it is possible to execute functions using contactless type communication.

Figure 3:
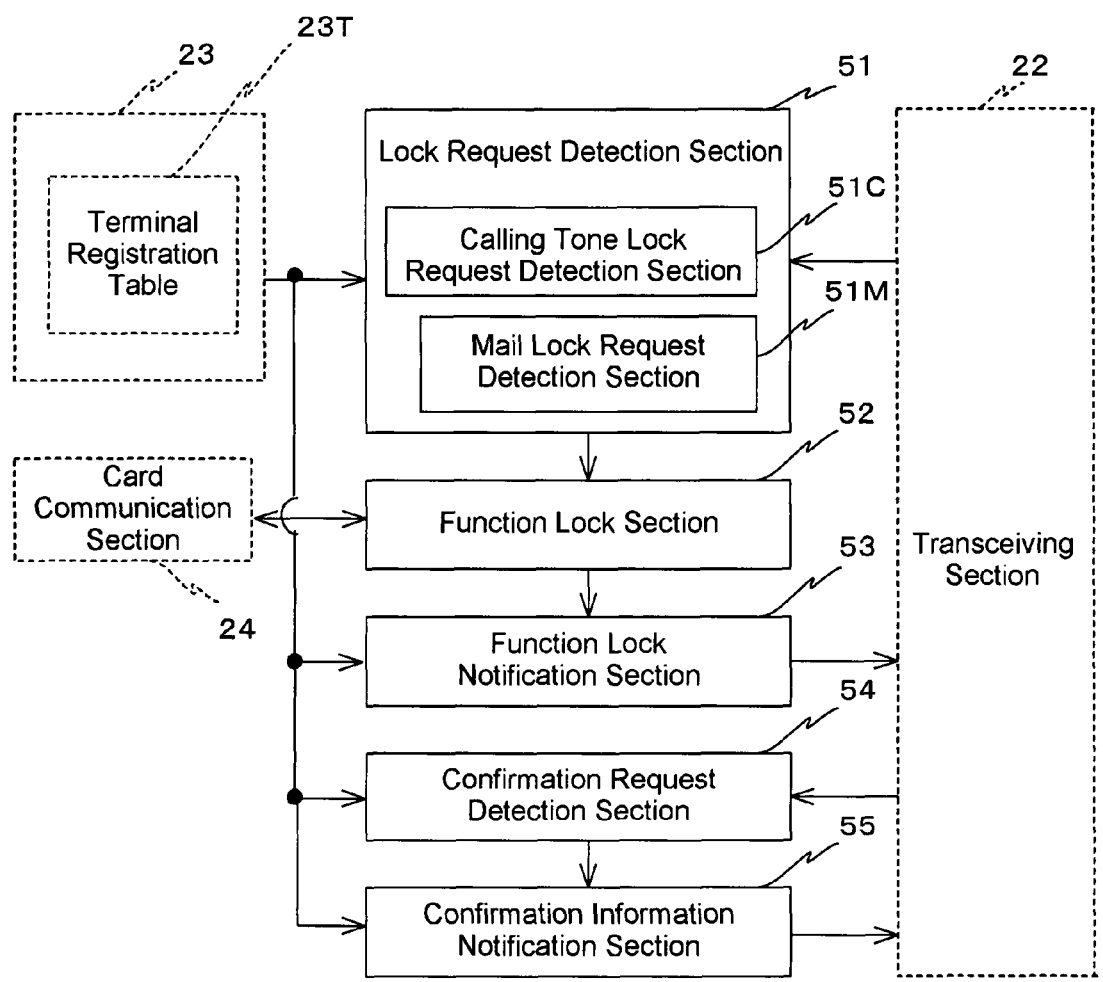
FIG. 3 is a drawing for describing the structure of software executed in the control section of FIG. 2.

The control section 21 is equipped with a central processing unit (CPU) and digital signal processor (DSP) and so forth for carrying out various data processing for implementing general cellular phone functions, and for carrying out control of operations of other structural elements described above. Among the software such as programs executed on the control section 21, the structure of software groups related to remote function lock of the IC card function section 30 is as shown in FIG. 3.

Specifically, the software group relating to remote function lock of the IC card function section 30 includes (i) a lock request detection section 51 for detecting a remote function lock request for the IC card function section 30 received via the transceiver section 22 while appropriately referencing the storage section 23, (ii) a function lock section 52 for locking the function of the IC card function section 30 via the card communication section 24 when notification to the effect that a remote function lock request has been detected is received from the lock request detection section 51 during operation of the IC card function section 30 and (iii) a function lock notification section 53 for transmitting function lock information via the transceiver section 22 while appropriately referencing the storage section 23 when notification to the effect that function of the IC card function section 30 has been locked in accordance with a remote function lock request from the function lock section 52.

In this embodiment, the lock request detection section 51 comprises a calling tone lock request detection section 51C and a mail lock request detection section 51M. After a call had been received from the locking telephone unit whose telephone number is registered in the terminal registration table 23T, if calling tones for designated call number of times which is registered in the terminal registration table 23T has occurred, and after the calling tones no new calling tone occurred, the calling tone lock request detection section 51C recognizes that there is a remote function lock request.

The mail lock request detection section 51M recognizes that there is a remote function lock request upon receipt of an e-mail of predetermined content from the locking messaging terminal having an e-mail address registered in the terminal registration table 23T. In this embodiment, the e-mail content for a lock request is stored in the storage section 23 separately from the terminal registration table 23T. Note that with this embodiment, a requirement as the e-mail for lock request is to have a predetermined title and text body is a requirement that in its content.

The function lock notification section 53 transmits an e-mail of predetermined content towards the locking notification messaging terminal having an e-mail address registered in the terminal registration table 23T. In this case, the e-mail content for a lock notification is stored in the storage section separately from the terminal registration table 23T.

The software group relating to remote function lock for the IC card function section 30 also includes (iv) a confirmation request detection section 54 for detecting a confirmation request for function lock of the IC card function section 30 that has been received via the transceiver section 22, while appropriately referencing the storage section 23, and (v) a confirmation information notification section 55 for transmitting confirmation information for a function lock via the transceiver section 22, while appropriately referencing the storage section 23, when notification to the effect that a confirmation request for function lock has been received from the confirmation request detection section 54 while the function of the IC card function section 30 is locked.

In this embodiment, the confirmation request detection section 54 recognizes that there is a confirmation request for the fact that function of the IC card function section 30 is locked when a calling tone has been generated more than a designated call tone number of times that is registered in the terminal registration table 23T, after a call has been received from the confirming telephone unit having a telephone number registered in the terminal registration table 23T. Also, the function lock notification section 53 transmits voice guidance as confirmation information for the fact that the function of the IC card function section 30 is locked towards the confirming telephone unit that is making a call. The content of the voice guidance is stored in the storage section 23 separately from the terminal registration table 23T.

Note that in this embodiment, incidentally, the lock request telephone unit may also be the confirming telephone unit, and in that case would be called a locking/confirming telephone unit.

Figure 4:
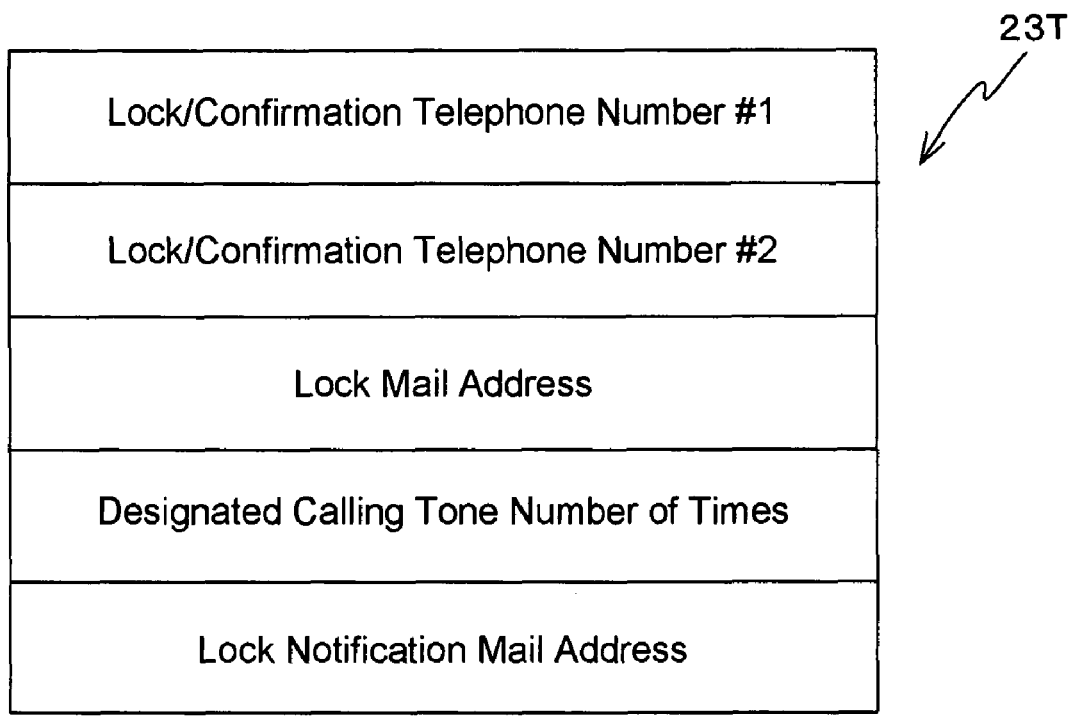
FIG. 4 is a drawing for describing the structure of a terminal registration table of FIG. 2 and FIG. 3.

Returning to FIG. 2, two types of telephone number, such as lock/confirmation telephone number #1, #2, can be registered in the terminal registration table 23T inside the storage section 23 as identifiers for the lock/confirmation telephone units, as shown in FIG. 4. It is also possible to further register a lock mail address, being an identifier for a lock messaging terminal, a designated calling tone number of times, and a lock notification mail address being an identifier for a lock notification messaging terminal, in the terminal registration table 23T. Operation of registering to the terminal registration table 23T will be described later.

Figure 5:
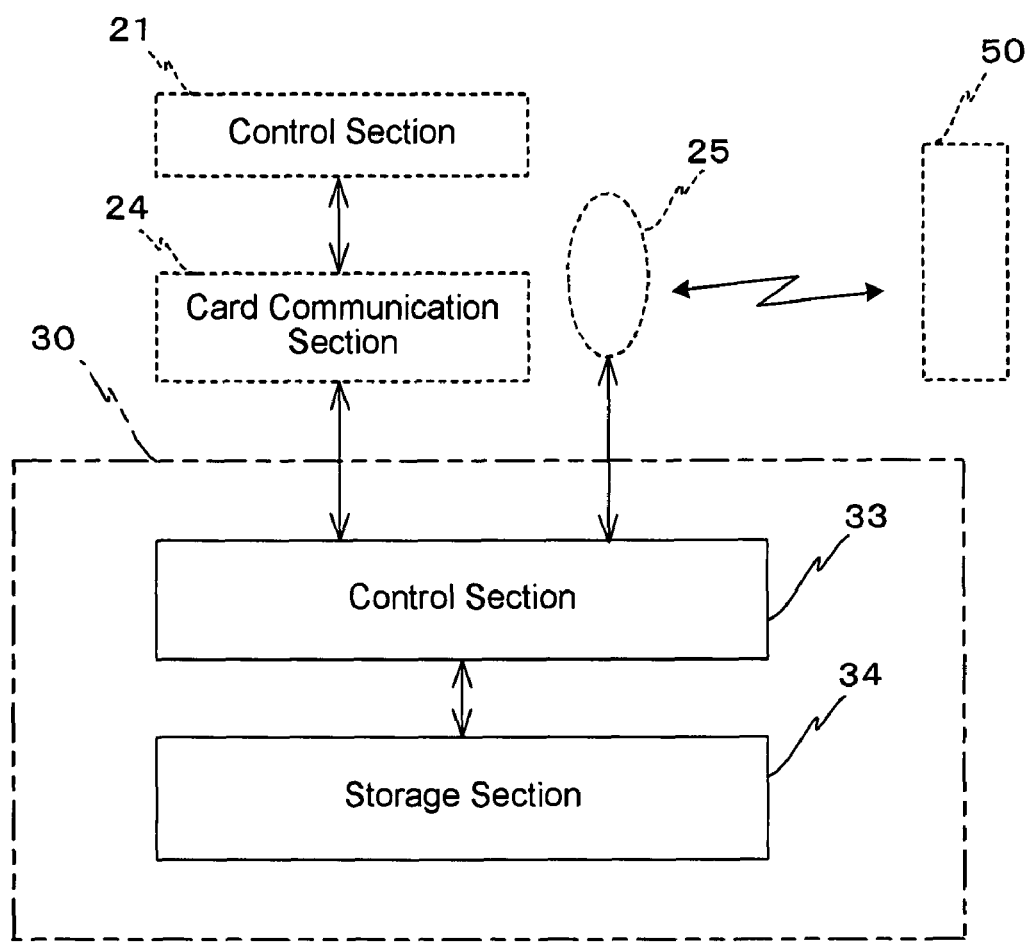
FIG. 5 is a functional block diagram showing the structure of an IC card function section of FIG. 2.

As shown in FIG. 5, the IC card function section 30 is provided with (a) a control section 33 for carrying out control of communication with the control section 21 via a wired communication path and contactless type communication with the reader writer 50 via the antenna 25, as well as overall control of the IC card function section 30, such as reading from and writing to the storage section 34, which will be described later, and (b) a storage section 34 for storing data and so forth of the IC card function section 30.

Note that the reader writer 50 shown in FIG. 2 and FIG. 5 is a proximity wireless transceiver for carrying out contactless type communication with the IC card function section 30 via the antenna 25.

A registration operation into the terminal registration table 23T will now be described.

Figure 6:
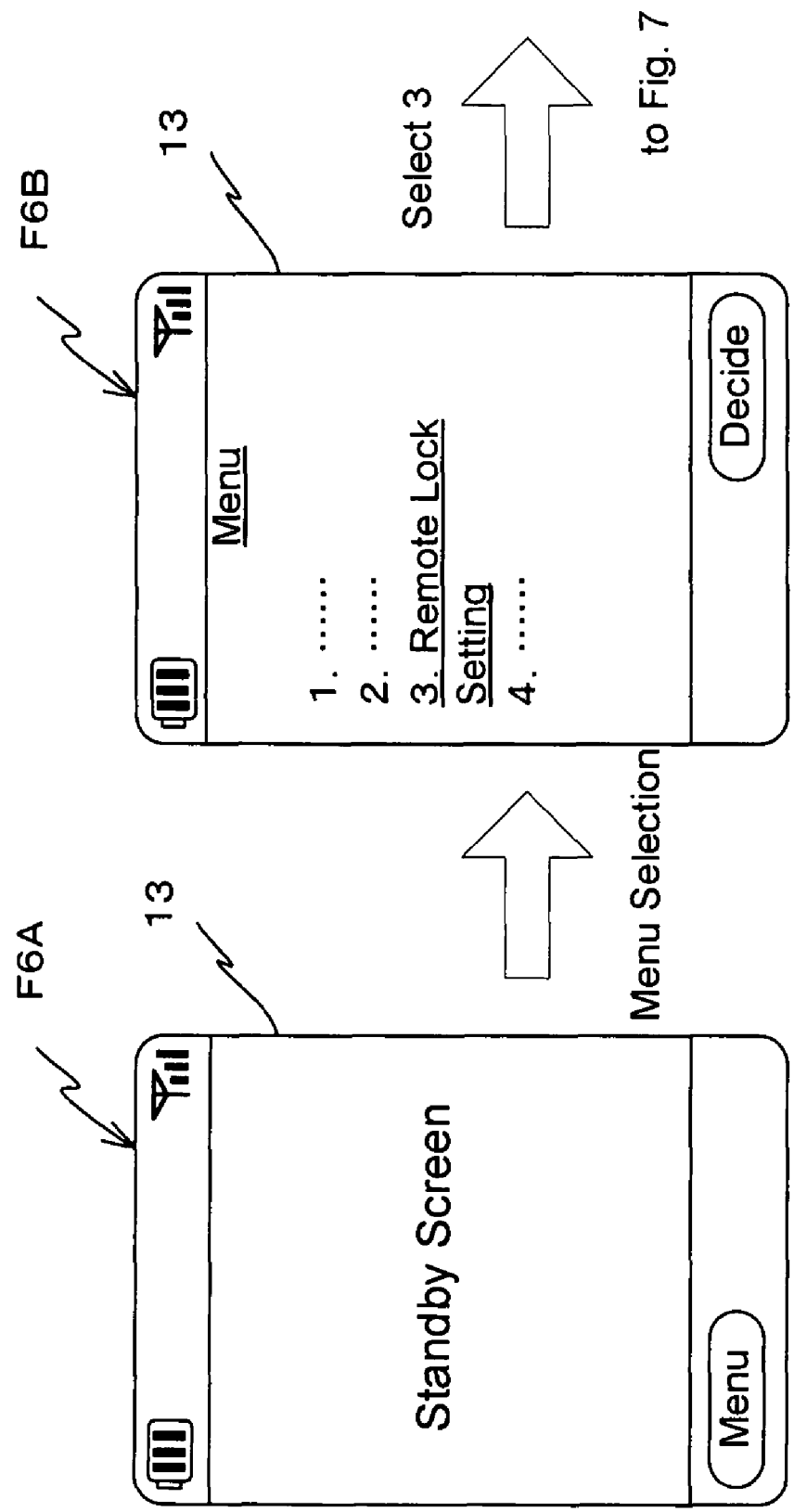
FIG. 6 is a first screen transition diagram for explaining an operation of registering to the terminal registration table of FIG. 4.
Figure 7:
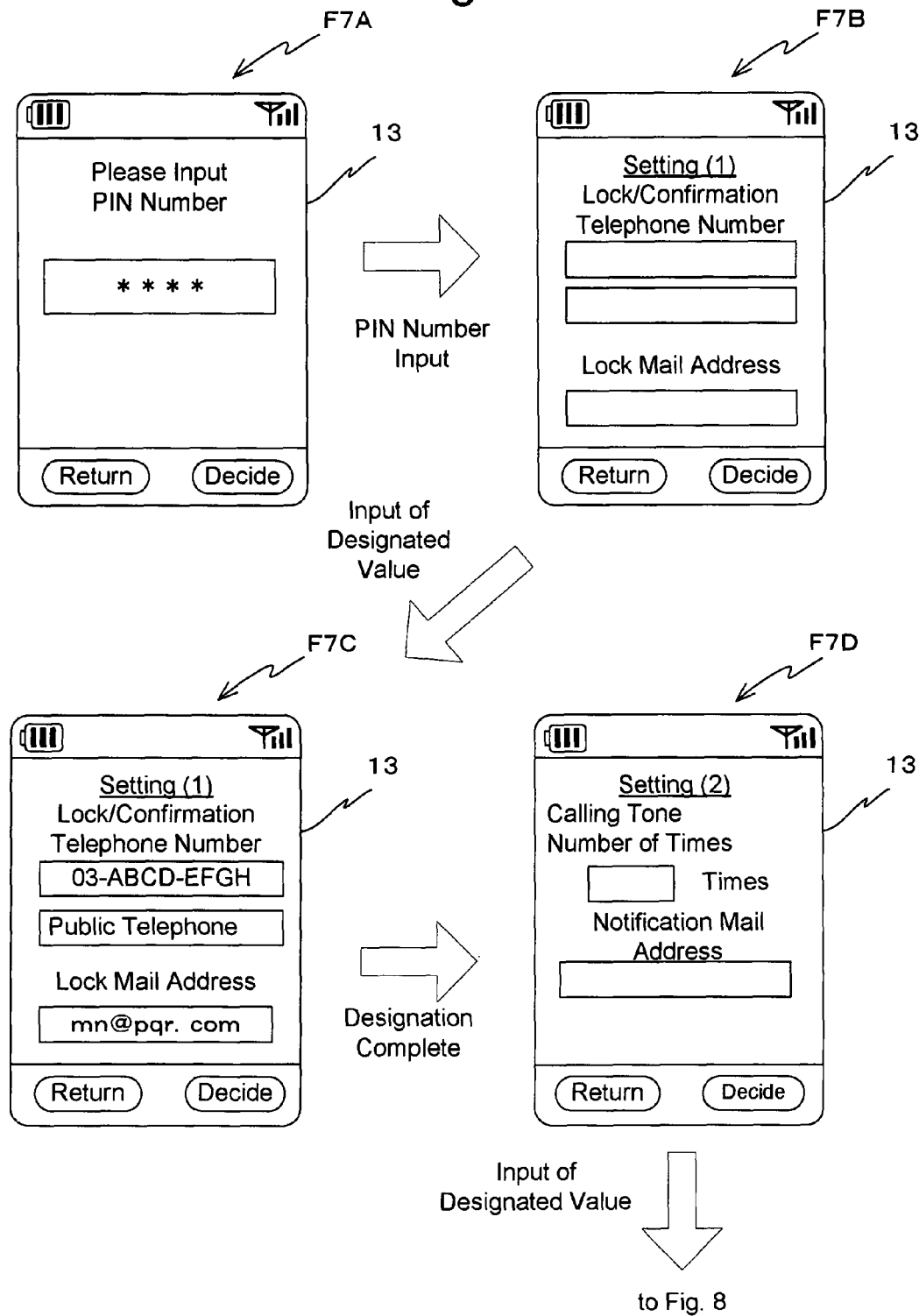
FIG. 7 is a second screen transition diagram for explaining an operation of registering to the terminal registration table of FIG. 4.
Figure 8:
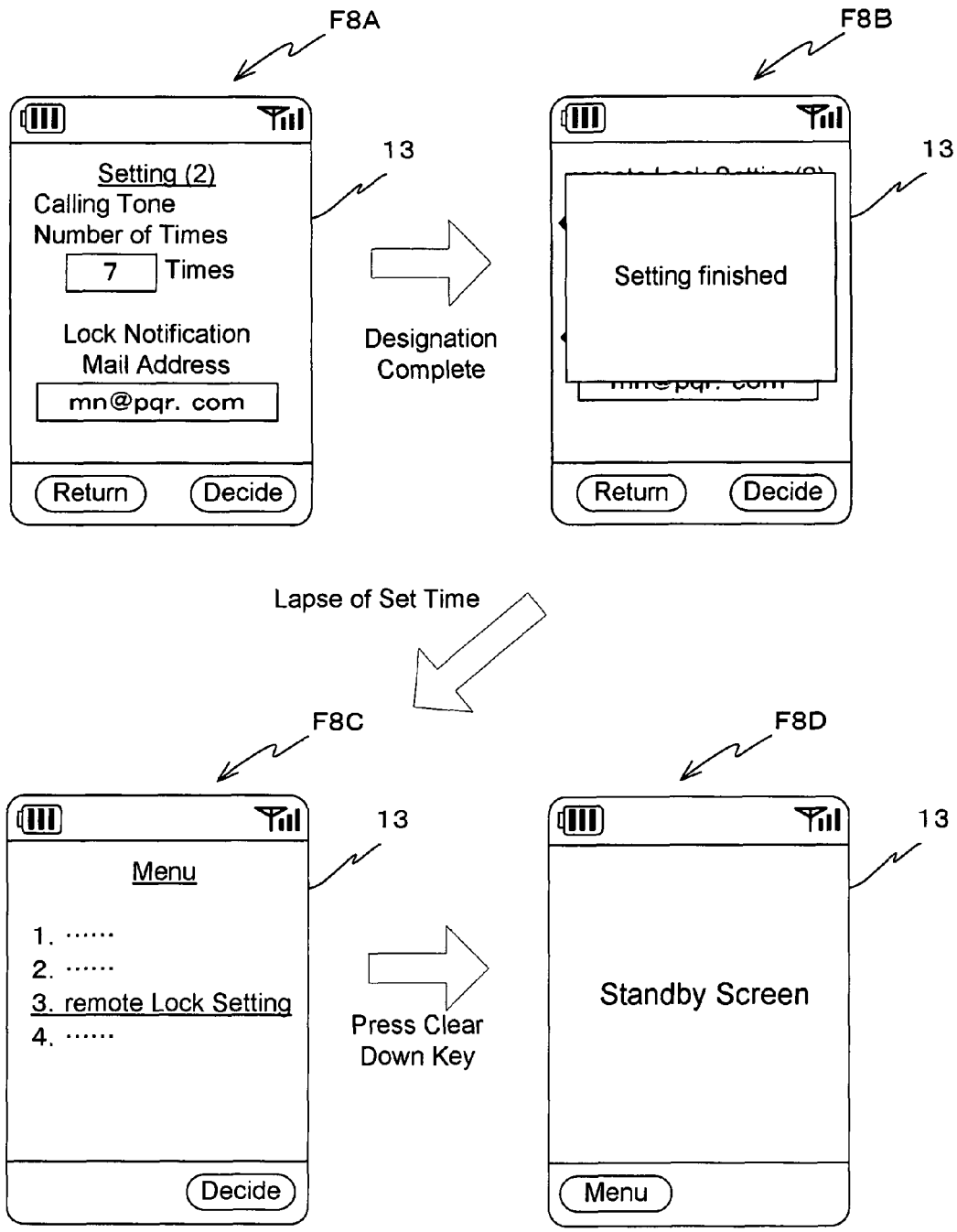
FIG. 8 is a third screen transition diagram for explaining an operation of registering to the terminal registration table of FIG. 4.

When the power supply of the telephone unit 10 is turned on, an initialization operation takes place in the telephone unit 10, and after that a standby screen shown by the display F6A in FIG. 6 is displayed on the display section 13. If the user then inputs menu display commands from the operation section 12 in this state, the menu screen shown by the display F6B is displayed on the display section 13. If the user selected "3. remote lock setting" from this menu display screen, the PIN number input screen shown by F7A in FIG. 7 is displayed.

If the user correctly inputs the PIN number in the PIN number input screen, the remote lock setting (1) screen shown by the display F7B is displayed. At least one type of lock/confirmation telephone number and a lock mail address, if required, are input by the user in this remote lock setting (1) screen. An example of a lock/confirmation telephone number and a lock e-mail address input in this manner is shown by the display F7C. Note that the display F7C shows an example where a specific telephone number (03-ABCD-EFGH), such as a telephone number of a home telephone, is input as the lock/confirmation telephone number #1, and a plurality of telephone numbers having a specific attribute such as public telephone is input as a lock/confirmation telephone number #2 using "public telephone". The display F7C also shows an example where an address (mn@pqr.com) of a specific messaging terminal such as an e-mail address of a home personal computer is input as a lock mail address.

After the lock/confirmation telephone number and lock mail address if required have been input in the above-described manner, the user performs confirmation to complete designation of the lock/confirmation telephone number and lock mail address. Once designation of the lock/confirmation telephone number and the lock mail address, if required, has been completed in this way, after being registered in the above-described terminal registration table 23T, the remote lock setting (2) screen shown by display F7D is displayed. The above-described designated calling tone number of times and lock notification mail address are input by the user in this remote lock setting (2) screen. An example of a designated calling tone number of times and lock notification address input in this manner is shown by the display F8A in FIG. 8. The display F8A shows an example where "7" times is input as the designated calling tone number of times, and the same mail address as the above-described lock mail address is input as the lock notification mail address.

After input of the designated calling tone number of times and lock notification mail address in the above-described manner, designation of the designated calling tone number of times and lock notification mail address is completed upon confirmation by the user. Once designation of the designated calling tone number of times and the lock notification mail address has been completed in this way, after being registered in the above-described terminal registration terminal 23T the remote lock setting completion screen shown by display F8B is displayed.

After this, when a set time has elapsed the above-described menus screen is returned to, as shown by display F8C. If a clear down key, functioning also as a reset key for returning to the standby screen display state is then pressed, the standby screen is returned to as shown by display F8D.

Note that, description has been given for a setting sequence in a case where there is no remote lock setting, but a case where some or all current remote lock settings are changed, the changed content is designated in the same manner as described above. In the case where remote lock setting has been performed previously, when there is display of the remote lock setting (1) screen and the remote lock setting (2) screen for content change, the registered content in the terminal registration table 23T at that time will be displayed in the fields of displays F7B and F7D.

Next, description will be given for the function of an IC card function section 30 remote function lock operation and an IC card function section 30 function lock confirmation operation in the cellular phone 10 having the above-described structure and in which the above-described remote lock settings have been carried out.

As a prerequisite, at least one telephone number is registered as a lock/confirmation telephone number. In the following, a telephone unit having the lock/confirmation telephone number is called a "locking/confirmation telephone unit".

Also as a prerequisite, the same e-mail address as the lock mail address and the lock notification mail address is registered. Therefore, since the locking messaging terminal and the lock notification messaging terminal are the same device, the device will be referred to as a "locking/notification messaging terminal" in the following.

<Remote Function Lock Request and Lock Confirmation Request from Locking/Confirmation Telephone Unit>

First of all, the case of executing a remote function lock request from the locking/confirmation telephone unit, and executing a lock confirmation request from the locking/confirmation telephone unit will be described with reference to FIG. 9.

Figure 9:
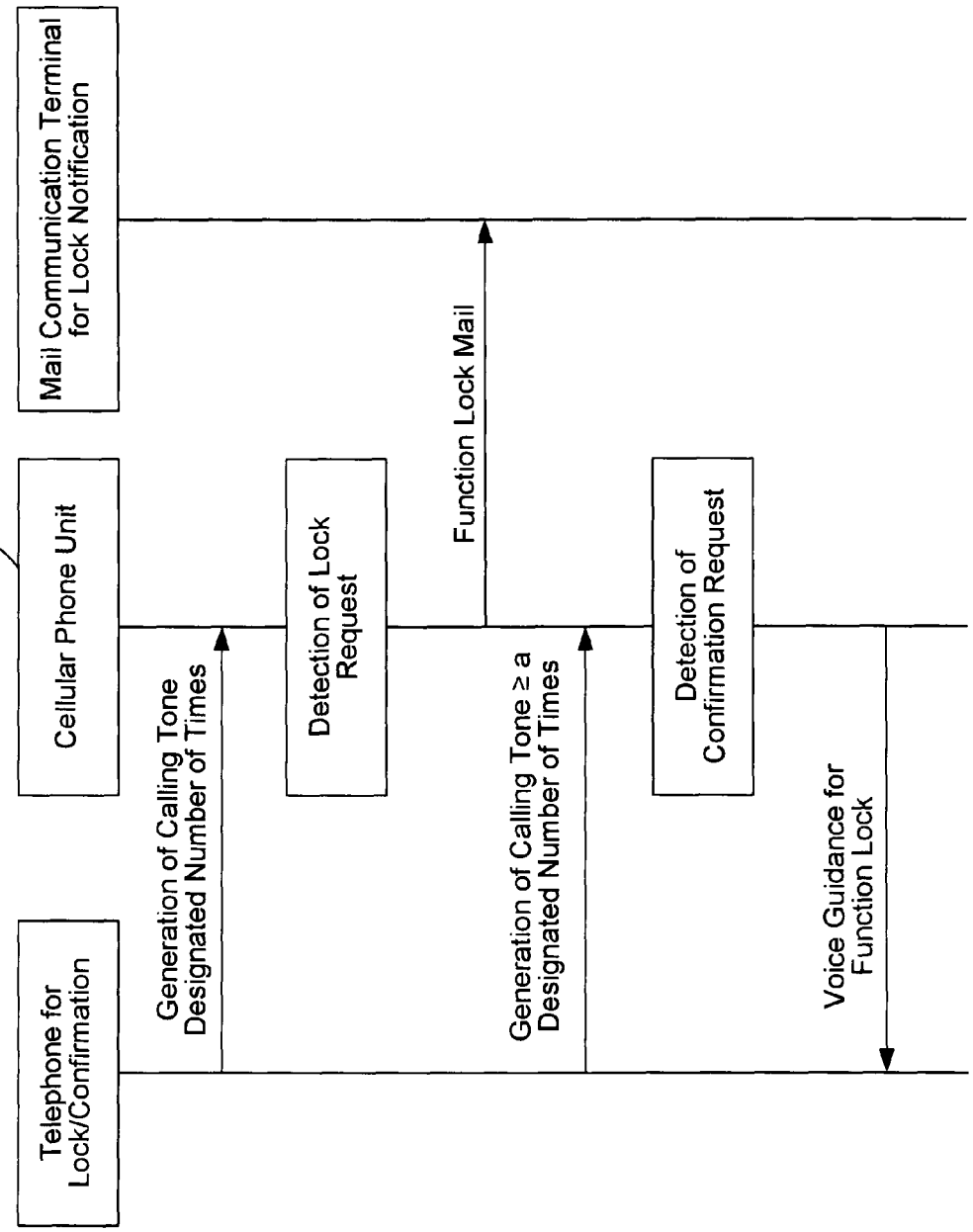
FIG. 9 is a sequence diagram for describing one example of a remote function lock and function lock confirmation operation for the IC card function section of FIG. 2.

In this case, when a user realizes that he has misplaced and lost his cellular phone 10, a telephone call is made to the cellular phone 10 from the locking/confirmation telephone unit having its telephone number registered in the terminal registration table 23T of the cellular phone 10, as shown in FIG. 9. After calling tone has been generated the designated calling tone number of times registered in the terminal registration table 23T, the user then performs an off hook operation of the locking/confirmation telephone unit before the next occurrence of calling tone to perform a remote function lock request for the IC card function section 30.

The remote function lock request resulting from this calling tone is detected by the calling tone lock request detection section 51C of the above-described lock request detection section 51 of the cellular phone 10. At the time of this detection, the calling tone lock request detection section 51C detects a lock request while referencing the registered content of the terminal registration table 23T.

When the remote function lock request is detected, the lock request detection section 51 notifies to this effect to a function lock section 52. The function lock section 52 that has received this notification transmits a function lock instruction to the IC card function section 30 via the card communication section 24 in the event that the IC card function section 30 is operating. The control section 33 receives the function lock instruction in the IC card function section 30. The control section 33 then locks the function of the IC card function section 30 and sends an indication of this fact to the control section 21. Once the function is locked in this way, the control section 33 no longer responds even if a transaction is received from the reader writer 50.

Using the control section 21 the function lock section 52 receives indication of the fact that the function of the IC card function section 30 has been locked. The function lock section 52 that has received this indication then sends indication of the fact that the function of the IC card function section 30 has been locked to the function lock notification section 53. The function lock notification section 53 receiving this indication reads out s lock notification mail address from the terminal registration table 23T, and also reads out content of a lock notification mail (title and text body) from the storage section 23. The function lock notification section 53 then sends the function lock e-mail as lock notification information via the transceiver section 22 and the mobile communication network to the lock notification messaging terminal unit having the lock notification mail address.

As a result of this, it is possible for the user to know that the function of the IC card function section 30 of the cellular phone 10 has been locked by referencing the lock notification messaging terminal unit.

Note that, in the event that the function of the IC card function section 30 is already locked when the remote lock request is received, the function lock section 52 does not execute the function lock command to the IC card function section 30, but sends indication of the fact that the function of the IC card function section 30 is locked to the function lock notification section 53. The function lock notification section 53 receiving this indication reads out a lock notification mail address from the terminal registration table 23T, and also reads out content of an already locked notification mail (title and text body) for informing that the function is already locked from the storage section 23. The function lock notification section 53 then sends the already locked notification mail via the transceiver section 22 and the mobile communication network to the lock notification messaging terminal unit having the lock notification mail address.

As a result of this, it is possible for the user to know that the function of the IC card function section 30 of the cellular phone 10 has already been locked by referencing the locking/notification messaging terminal.

After the function of the IC card function section 30 has been locked in the above-described manner, in the event that a user who can not immediately use the lock notification messaging terminal wants to confirm early that the function of the IC card function section has been locked, the user performs a function lock confirmation request from the locking/confirmation telephone unit to the cellular phone 10. This confirmation request is carried out as a result of the user making a call from the locking/confirmation telephone unit to the cellular phone 10, and generating calling tone more than a designated calling tone number of times.

This type of confirmation request is detected by the confirmation request detection section 54 of the cellular phone 10. At the time of this detection, the confirmation request detection section 54 detects a confirmation request while referencing the registered content of the terminal registration table 23T.

When the confirmation request is detected, the confirmation request detection section 54 notifies to this effect to the confirmation information notification section 55. The confirmation information notification section 55 receiving this notification reads out voice guidance data for notifying the fact that the function of the IC card function section 30 is locked using voice from the storage section 23. The confirmation information notification section 55 then sends the voice guidance via the transceiver section 22 and the mobile communication network to the locking/confirmation telephone unit that is making a call.

As a result of this, the user who is making a call to the cellular phone 10 using the locking/confirmation telephone unit can confirm that the function of the IC card function section 30 is locked.

<Remote Function Lock Request from Locking Messaging Terminal, and Lock Confirmation Request from Locking/Confirmation Telephone Unit>

Next, the case of executing a remote function lock request from the locking messaging terminal, and executing a lock confirmation request from the locking/confirmation telephone unit will be described with reference to FIG. 10.

In this case, when a user realizes that he has misplaced and lost his cellular phone 10, a function lock request e-mail is sent to the cellular phone 10 from the locking messaging terminal having its e-mail address registered in the terminal registration table 23T of the cellular phone 10, as shown in FIG. 10. The content of the lock request e-mail is a predetermined title and text body, as described above.

The remote function lock request resulting from this e-mail is detected by the mail lock request detection section 51M of the lock request detection section 51 of the cellular phone 10. At the time of this detection, the mail lock request detection section 51M detects a lock request while referencing the registered content of the terminal registration table 23T.

In this manner, after the remote function lock request has been detected, the function of the IC card function section 30 is locked in the same was for the above-described case of a calling tone lock request, and a lock notification is sent to the lock notification messaging terminal as an e-mail.

Note that, also in the event that the function of the IC card function section 30 is already locked when the remote function lock request using e-mail is received, similarly to the above-described case of the remote function request using calling tone, the function lock section 52 does not execute the function lock command to the IC card function section 30, but sends indication of the fact that the function of the IC card function section 30 is locked to the function lock notification section 53. The function lock notification section 53 then sends the already locked notification mail via the transceiver section 22 and the mobile communication network to the locking/notification messaging terminal.

Also, after the function of the IC card function section 30 has been locked, in the event that a confirmation request for function lock has been received in the cellular phone 10 from the locking/confirmation telephone unit, the confirmation request detection section 54 detects the confirmation request in the same was as for the case of the above-described function lock request using the calling tone. Then, in a similar manner to the case of FIG. 9, voice guidance for notifying the fact that the function of the IC card function section 30 has locked using voice is sent to the locking/confirmation telephone unit that is making a call by the confirmation information notification section 55.

As has been described above, with this embodiment when a lock request for function of the IC card function section 30 is executed from the locking terminal to the cellular phone 10 via the mobile communication network, the lock request detection section 51 detects the lock request. When the lock request is detected in this manner, the function lock section 52 locks the function of the IC card function section 30 by sending a function lock instruction via a wired communication path to the IC card function section 30. The function lock notification section 53 then notifies the fact that the function has been locked to the locking/notification messaging terminal pre-registered in the terminal registration table 23T via the transceiver section 22 and the mobile communication network. As a result of this, it is possible for the user of the cellular phone 10 to confirm that the function of the IC card function section 30 of the cellular phone 10 has been locked by referencing the locking/notification messaging terminal unit. Therefore, according to this embodiment, since it is possible for a user to confirm that the function of the IC card function section 30 of the cellular phone 10 has been locked, it is possible to improve the convenience for the user.

Also, with this embodiment, telephone numbers and an electronic mail address that are identifiers for a locking telephone unit and a locking messaging terminal, being a locking terminal, are pre-registered in the terminal registration table 23T. This means that it is possible ensure convenience for the user while the user appropriately restricts lock request possible originators.

Also with this embodiment, it is made possible to include a calling telephone unit in the locking terminal, and when the calling tone lock request detection section 51C of the cellular phone 10 detects generation of calling tone a designated calling tone number of times after a call is received from the locking telephone unit, it is recognized that there is a lock request. It is therefore possible to lock function of the IC card function section 30 of the cellular phone 10 that has been lost by the simple operation of generating a calling tone a specified number of times using a calling telephone unit such as a home telephone or a public telephone.

Also with this embodiment, it is made possible to include an electronic messaging terminal in the locking terminal, and if the mail lock request detection section 51M of the cellular phone 10 receives e-mail of predetermined content, it is recognized that there is a lock request. It is therefore possible to lock function of the IC card function section 30 of the cellular phone 10 that has been lost by the simple operation of transmitting a function lock request mail to the cellular phone 10 using an electronic messaging terminal such as a home personal computer.

Also, with this embodiment when a confirmation request for the fact that function of the IC card function section 30 is locked is executed from the confirmation terminal to the cellular phone 10 via the mobile communication network, the confirmation request detection section 54 detects the confirmation request. If the confirmation request is detected in this way, the confirmation information notification section 55 transmits confirmation information with content to the effect that the function of the IC card function section 30 is locked to the confirmation terminal. Therefore, after function lock of the IC card function section 30, the user of the cellular phone 10 can confirm that the function of the IC card function section 30 is locked in the confirmation terminal used for the confirmation request.

Also, with this embodiment, a telephone number that is an identifier for a confirmation terminal is pre-registered in the terminal registration table 23T. This means that it is possible to ensure convenience for the user while the user appropriately restricts confirmation request possible originators.

Also, with this embodiment, if the confirmation request detection section 54 detects generation of calling tone more than a designated calling tone number of times after a call is received from the confirmation telephone unit, while function of the IC card function section 30 is locked, the fact that there is a confirmation request is recognized. It is therefore possible to confirm that function of the IC card function section 30 of the cellular phone 10 that has been lost is locked by the simple operation of generating the calling tone more than a designated calling tone number of times using a calling telephone unit such as a home telephone or a public telephone.

Also with this embodiment, a voice message is sent to the confirmation terminal as confirmation information to the effect that the function of the IC card function section 30 is locked. Therefore, the confirmation information is notified to the confirmation terminal in a form that is easy for the user to comprehend.

Note that with the above-described embodiment, the locking telephone unit and the confirmation telephone unit are made the same telephone unit, it they can also be different telephone units. Further, the number of lock telephone units and confirmation telephone units can be an arbitrary number.

Also with the above-described embodiment, there is only one lock messaging terminal, but there may be a plurality of lock messaging terminals.

Also with the above-described embodiment, with respect to the function lock request mail, the title and text body are predetermined, but it is also possible for only the title or only the text body to be predetermined.

Also with the above-described embodiment, the locking/notification terminal is made a messaging terminal, but it is also possible to make it a telephone unit that can use an answering machine function.

Also with the above-described embodiment, there is only one locking/notification terminal, but there may be a plurality of locking/notification terminals.

Also with the above-described embodiment, the confirmation terminal is made a telephone unit, but it is also possible to make it a messaging terminal. In this case, e-mail is used as confirmation information.

Also with the above-described embodiment, the IC card function section 30 is fixedly built into the cellular phone 10, and can not be inserted or taken out. On the other hand, as shown comprehensively in FIG. 11A and FIG. 11B, it is also possible to use an IC card 30' that operates in the same way as the IC card function section 30, and to use a cellular phone 10' that, compared to the cellular phone 10 of the above-described embodiment (refer to FIG. 1A and FIG. 1B), is further provided with a card housing section 19 which the IC card 30' can be inserted into or taken out of.

Figure 12:
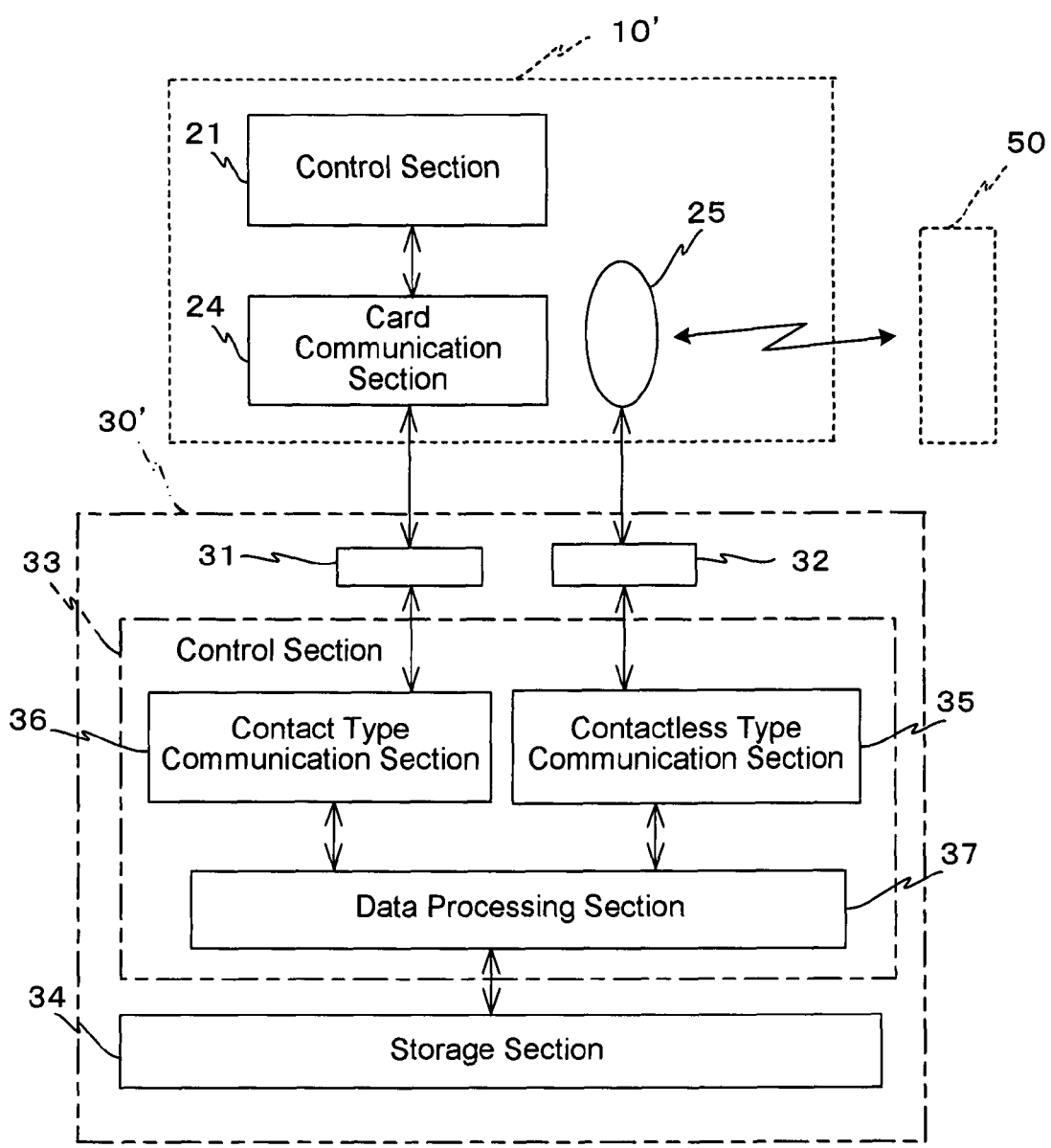
FIG. 12 is a functional block diagram showing the structure of an IC card of FIG. 11.

In this case, as shown in FIG. 12, the IC card 30' is provided with (a) a control section 33 for carrying out control of contact type communication via a contact type communication terminal 31 and control of contactless type communication via a contactless type communication terminal 32, and for carrying out overall control of the IC card, such as reading from and writing to a storage section 34, and (b) the storage section 34. Note that, it is possible to adopt a terminal that conforms to the SDIO (Secure Digital Input/Output) card standard as the contact type communication terminal 31 of the IC card 30'. It is also possible for the IC card 30' to adopt an RFID (Radio Frequency-Identification) card from the point of view of contactless communication.

The control section 33 is provided with (i) a contactless type communication section 35 for controlling con-contact communication operation with the reader writer 50, (ii) a contact type communication section 36 for controlling contact type communication with the cellular phone 10', and (iii) a data processing section 37 for carrying out data processing, including reading and writing data from and to the storage section 34.

When the IC card 30' is housed in the card housing section 19, the contact type communication terminal 31 is electrically connected to the card communication section 24, and the contactless communication terminal 32 is electrically connected to the antenna 25. As a result, if the IC card 30' is housed in the card housing section 19, then similarly to the above-described IC card function section 30 communication becomes possible with the cellular phone 10' via the wired communication path, and communication is made possible with the reader writer 50 using contactless type communication.

In FIG. 11A, FIG. 11B and FIG. 12, elements that are the same or equivalent to those in the above-described embodiment have the same reference numbers assigned, and repeated description will be omitted.

Also, in the above-described embodiment, the present invention has been applied to a cellular phone, but obviously the present invention may also be applied to mobile communication terminals besides a cellular phone.

As has been described above, the function lock information notification method of the present invention can be applied to notification of function lock of a contactless type communication device of a mobile information terminal fitted with the contactless communication device. Also, the mobile communication terminal of the present invention can be applied to a mobile information terminal for notifying function lock of a fitted contactless type communication device to a user.

What is claimed is:

1. A function lock information notification method for notifying lock information for a function of a contactless type communication device of a mobile communication terminal fitted with the contactless communication device that is capable of communication via a wired communication path, comprising the steps of:
    performing, to the mobile communication terminal, a lock request for a function of the contactless type communication device from a locking terminal via a mobile communication network, wherein the mobile communication terminal has a plurality of functions including at least the function of the contactless type communication device, telephone functions, and e-mail functions;
    causing the mobile communication terminal to lock the function of the contactless type communication device via the wired communication path, and not lock other functions of the plurality of functions of the mobile communication terminal; and
    notifying the fact that the function of the contactless communication device has been locked to a function lock information notified party pre-registered in the mobile communication terminal via the mobile communication network by the mobile communication terminal.

2. The function lock information notification method of claim 1, wherein the locking terminal is a communication terminal having an identifier for a lock request possible originator pre-registered in the mobile communication terminal.

3. The function lock information notification method of claim 1, wherein at least one e-mail communication terminal is contained in the locking terminal, and
    the mobile communication terminal recognizes that there is a lock request upon receipt of an e-mail of predetermined content from the at least one e-mail communication terminal.

4. The function lock information notification method of claim 1, further comprising the steps of:
    performing, to the mobile communication terminal, a confirmation request for lock of the function from a confirmation terminal via a mobile communication network; and
    sending confirmation information wherein content that the function of the contactless type communication is locked, to the confirmation terminal in response to the confirmation request, by the mobile communication terminal, when the function of the contactless type communication device is locked.

5. The function lock information notification method of claim 4, wherein the confirmation terminal is a communication terminal having an identifier for a confirmation request possible originator pre-registered in the mobile communication terminal.

6. The function lock information notification method of claim 5, wherein the confirmation terminal comprises at least one calling phone, and
    the mobile communication terminal, in a state where the function of the contactless type communication device is locked, confirms that there is a confirmation request upon detection of generation of a calling tone more than a predetermined number of times after a call is received from the at least one calling phone.

7. The function lock information notification method of claim 6, wherein the confirmation information is a voice message.

8. The function lock information notification method of claim 4, wherein the locking terminal comprises the confirmation terminal.

9. A function lock information notification method for notifying lock information for a function of a contactless type communication device of a mobile communication terminal fitted with the contactless communication device that is capable of communication via a wired communication path, comprising the steps of:
performing, to the mobile communication terminal, a lock request for a function of the contactless type communication device from a locking terminal via a mobile communication network;
causing the mobile communication terminal to lock the function of the contactless type communication device via the wired communication path; and
notifying the fact that the function of the contactless communication device has been locked to a function lock information notified party pre-registered in the mobile communication terminal via the mobile communication network by the mobile communication terminal, wherein
the locking terminal comprises at least one calling phone, and
the mobile communication terminal recognizes that a lock request has been received upon detection of generation of a calling tone a predetermined number of times after a call is received from the at least one calling phone.

10. A mobile communication terminal, fitted with a contactless type communication device capable of communication via a wired communication path, comprising:
lock request detection means for detecting a lock request for a function of the contactless type communication terminal received from the locking terminal via a mobile communication network, wherein the mobile communication terminal has a plurality of functions including at least the function of the contactless type communication device, telephone functions, and e-mail functions;
function lock means for locking the function of the contactless type communication device, via the wired communication path, when the lock request has been detected by the function lock request detection means, and not lock other functions of the plurality of functions of the mobile communication terminal; and
function lock notification means for notifying the fact that the function of the contactless communication device has been locked to a pre-registered function lock notified party via the mobile communication network.

11. The mobile communication terminal of claim 10, further provided with storage means for storing a terminal registration table registering an identifier for the locking terminal and identifiers for notification communication terminals that are notified parties for the fact that the function is locked.

12. The mobile communication terminal of claim 10, wherein the locking terminal comprises at least one e-mail communication terminal, and
the lock request detection means is further provided with mail lock request detection means for recognizing that there is a lock request upon receipt of an e-mail of predetermined content from the at least one e-mail communication terminal.

13. The mobile communication terminal of claim 10, further comprising:
lock confirmation request detection means for detecting receipt of a confirmation request for lock of the function from a confirmation terminal via a mobile communication network; and
confirmation information transmission means for transmitting confirmation information, with content that the function of the contactless type communication device is in a locked state, to the confirmation terminal in response to the confirmation request, when the function of the contactless type communication device is in a locked state.

14. The mobile communication terminal of claim 13, wherein an identifier for the confirmation terminal is further stored in the terminal registration table.

15. The mobile communication terminal of claim 13, wherein the confirmation terminal has at least one calling phone, and
the lock confirmation request detection means is further provided with calling tone confirmation request detection means for recognizing that there is a confirmation request upon detection of generation of a calling tone more than a predetermined number of times after a call is received from the at least one calling phone, in a state where the function of the contactless type communication device is locked.

16. The mobile communication terminal of claim 15, wherein the confirmation information transmission means transmits voice guidance as the confirmation information.

17. A mobile communication terminal, fitted with a contactless type communication device capable of communication via a wired communication path, comprising:
lock request detection means for detecting a lock request for a function of the contactless type communication terminal received from the locking terminal via a mobile communication network;
function lock means for locking the function of the contactless type communication device, via the wired communication path, when the lock request has been detected by the function lock request detection means; and
function lock notification means for notifying the fact that the function of the contactless communication device has been locked to a pre-registered function lock notified party via the mobile communication network, wherein
the locking terminal comprises at least one calling phone, and
the lock request detection means is further provided with calling tone lock request detection means for recognizing that there is the lock request upon detection of generation of a calling tone a predetermined number of times after a call is received from the at least one calling phone.

* * * * *